United States Patent [19]

Cullen

[11] 4,438,661

[45] Mar. 27, 1984

[54] HAND PROTECTOR

[76] Inventor: Frederick T. Cullen, 16360 Horace Ave., Granada Hills, Calif. 91344

[21] Appl. No.: 268,492

[22] Filed: May 29, 1981

[51] Int. Cl.$^3$ .............................................. B62K 21/26
[52] U.S. Cl. ................................................... 74/551.9
[58] Field of Search ...................... 74/551.8, 551.9, 558

[56] References Cited

U.S. PATENT DOCUMENTS 3,834,249 9/1974 Bothwell ............................ 74/551.9
4,141,567 2/1979 Scott .................................... 74/551.9

FOREIGN PATENT DOCUMENTS 515768 2/1955 Italy .................................... 74/551.8

Primary Examiner—Patrick D. Lawson
Attorney, Agent, or Firm—Roger A. Marrs

[57] ABSTRACT

A protector for the hand of a rider mounted on a bicycle or motorcycle is disclosed herein which is of semicircular shape having an arcuate mid-section terminating at its opposite ends in retainers for detachably mounting onto the handlebar of the vehicle about the handgrips thereof. The retainer at one end is of the C-clamp variety having fasteners securing the clamp to the handlebar while the other retainer is an inwardly projection adapted to cooperate with the open bore terminating end of the handlebar to hold or retain the protector in position.

1 Claim, 4 Drawing Figures

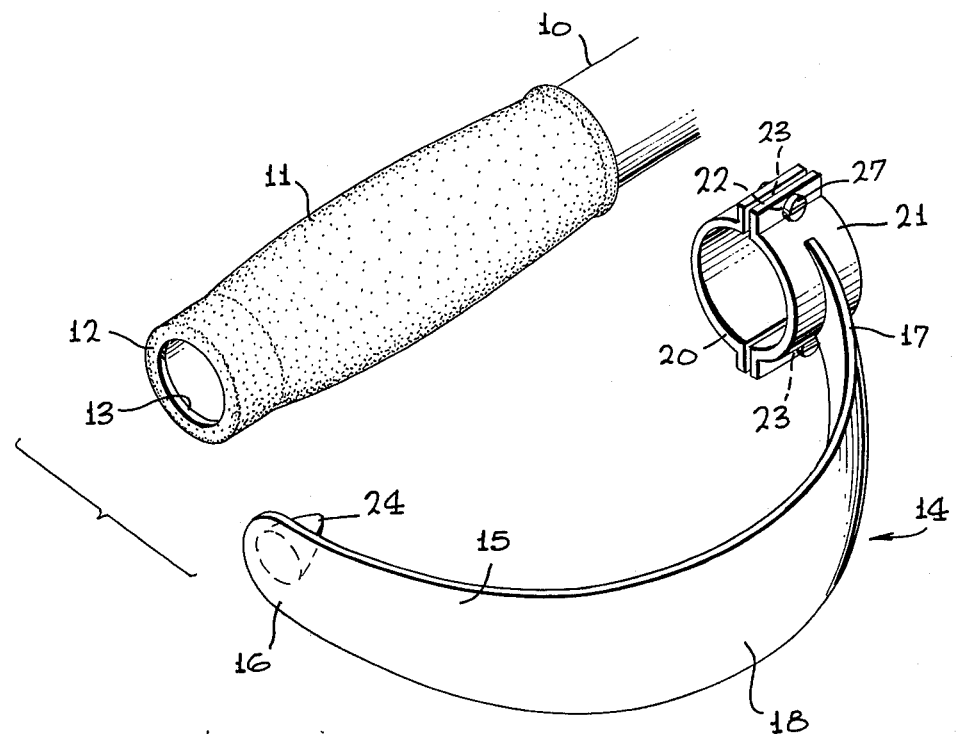
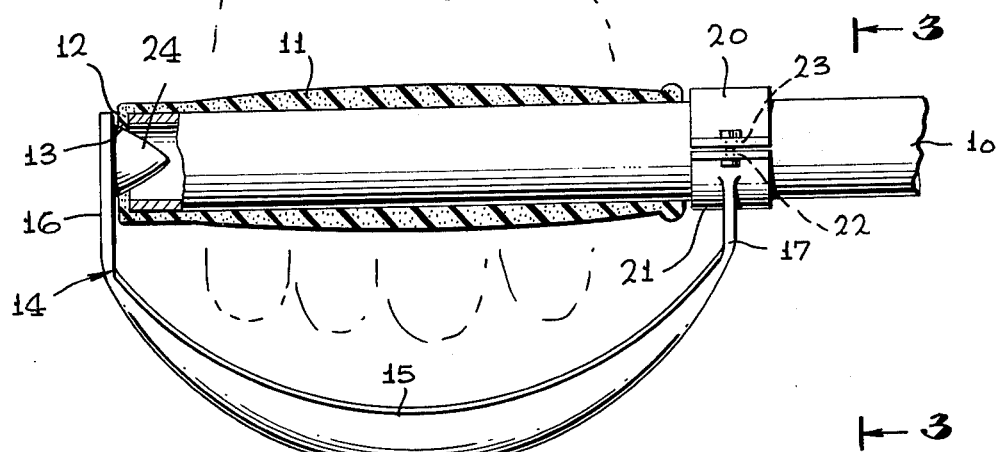
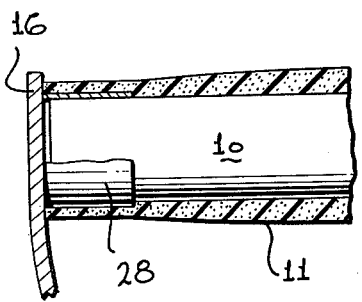
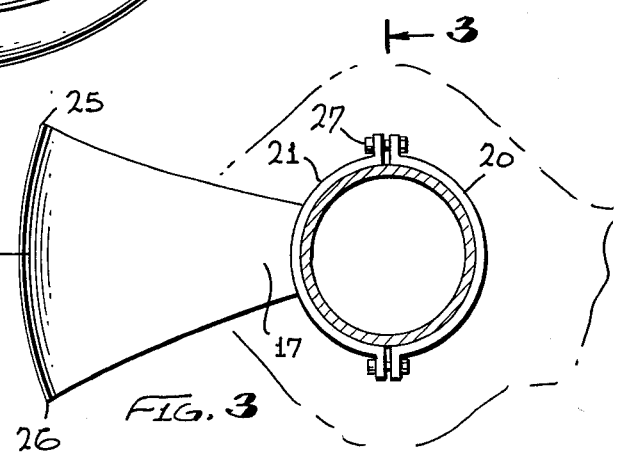

HAND PROTECTOR

BACKGROUND OF THE INVENTION

1. Field of the Invention

The present invention relates to a hand protector usable on the ends of a vehicle handlebar for protecting the hands of the driver and more particularly, to a novel hand protector having retaining means cooperating with a conventional handgrip for retaining the hand protector on the handlebar.

2. Brief Description of the Prior Art

In the past, handgrips have been provided on the opposite ends of a vehicle handlebar such as a bicycle or motorcycle which are readily grasped by the driver during the riding thereof. At times, the driver may ride through obstacles such as underbrush or bushes and at other times, his vehicle may spill or slide causing his hands to become injured or damaged upon impact and sliding across a roadway. During such a mishap, it is generally to the driver's advantage to grasp the handlebar handgrips and to maintain this grasp in order to control the vehicle as much as possible.

Some attempts have been made in the past to protect the driver's hands in the event of such mishaps which include special handgrips incorporating outwardly projecting guards which are slidably engaged with the ends of the handlebar. In other instances, U-shaped guards or handles are attached to the handlegrip and handlebar by means of solid fasteners such as screws or rivets. Problems and difficulties have been encountered in this latter instance which are due largely to the fact that the guard is extremely rigid and if caught on an obstruction, the tendency would be to further restrict the driver's control over the vehicle. In other instances, the retaining means for the hand protector or guard includes complicated fasteners which require tools for installation and which are difficult to remove because of corrosion and rust accumulations.

Therefore, a long standing need has existed to provide a novel handgrip guard which may be readily installed onto a handlebar terminating end without the use of special tools or fasteners and which will not disturb or require a special handgrip.

SUMMARY OF THE INVENTION

Accordingly, the above problems and difficulties are obviated by the present invention which provides a novel protector for the end of a vehicle rider or driver mounted on a bicycle or motorcycle which includes a semi-circular member having an arcuate mid-section terminating at its opposite ends in retainers for detachably mounting the protector onto the handlebar of the vehicle about the handgrips thereof. The retainer at one end of the protector is of a C-clamp variety having screw type fasteners securing the clamp to the handlebar while the other retainer at the opposite end of the handlebar is an inwardly projection adapted to being insertably received within the open bore of the handlebar. Preferably, the material of the protector is of a springable or resilient plastic material such that under extreme pulling conditions, the projector end of the protector or guard may be withdrawn from its engagement with the bore of the handlebar.

Therefore, it is among the primary objects of the present invention to provide a novel hand protector for a vehicle which will provide the driver with more control over his vehicle than can otherwise be had, particularly during times of mishap.

Another object of the present invention is to provide a novel hand protector surrounding the handgrip of a motorcycle or bicycle which incorporates retainers for detchably retaining the protector onto the handlebar.

Still another object of the present invention is to provide a novel hand protector which will greatly enhance and improve the safety of the driver by protecting the driver's hands as they grasp the opposite ends of the handlebar for either a bicycle or a motorcycle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view, illustrated in an exploded form, of the novel hand protector of the present invention preparatory to being installed on the end of a conventional vehicle handlebar;

FIG. 2 is a top plan view, partly in section, of the novel hand protector shown in FIG. 1;

FIG. 3 is a transverse cross-sectional view of the hand protector as taken in the direction of arrows 3—3 of FIG. 2; and FIG. 4 is a longitudinal cross-sectional view of another embodiment for a hand protector incorporating the present invention.

DESCRIPTION OF PREFERRED EMBODIMENT

Referring to FIG. 1, a typical handlebar carried by a motorcycle or bicycle is illustrated in FIG. 1 and is represented by numeral 10. The extreme end of the handlebar is provided with a conventional handgrip 11 which is normally of a tubular type having a central bore which is occupied by the diameter of the handlebar 10. Generally, the grip 11 is slid or pushed onto the end of bar 10 until the end of the bar bears against an end 12 of the grip 11. As is the conventional practice, the handgrip end 12 includes an aperture or hole 13 which is in communication with the interior of the bar 10.

The hand protector of the present invention is illustrated in the general direction of arrow 14 and includes a semi-circular section 15 having opposite ends 16 and 17 respectively. The mid-section of the protector as identified by numeral 18 is arcuate in plan view and further includes a curved or circular mid-section in transverse cross-sectional views. End 17 of the protector includes a C-clamp taking the form of a semi-circular portion 20 which is separate from the structure of the protector and a mating semi-circular portion 21 which is integrally formed and forms a unitary part of the protector. By placing the semi-circular portion 21 of the C-clamp over the bar 10, and by placing the semi-circular portion 20 underneath the bar 10 and aligning the apertures or holes, such as holes 22 and 23 with respect to each other, a fastener can be slid into place to secure the semi-circular portions together. Thusly, a clamp is provided which bears against the handlebar 10 to retain the protector end 17 in position.

The opposite end of the protector as indicated by numeral 16 includes an inwardly projecting element 24 which is tapered from its connection with the inside of the protector end 16 toward its free end. The tapered end of element 24 may be readily inserted into the hole 13 in the end of the handgrip 11.

Referring now in detail to FIG. 2, it can be seen that the element 24 is substantially inserted through the hole 13 in the end 12 of the handgrip 11. Also, it can be seen that the mid-section of the protector between its opposite ends is curved not only in plan view but is formed with an outwardly extending bulge or contour which is in its greatest depth in mid-section 18. Also, in FIG. 2 it can be seen that the user's hand is gripped onto the resilient handgrip 11 while the fingers are inserted in a space between the handgrip 11 and the backside or inside of the protector mid-section 18.

Construction in this manner provides that when the C-clamp represented by semi-circular portions 20 and 21 are fully engaged and secured onto the handlebar 10, the opposite end 16 may be readily held in position by means of element 24 insertably engaged within the hole 13 of the handgrip end 12.

Preferably, the protector 14 is composed of a resilient material such as a plastic or plastic-like composition so that should the protector be hit upon impact during a mishap, the hands of the user will be protected while the shock is absorbed by the resiliency of the material. Also, it can be seen that simple installation is required which does not envision the use of special tools or special knowledge on the part of the user.

Referring now in detail to FIG. 3, it can be seen that the central portion of the protector as indicated by numeral 18 is curved between its top edge 25 and its lower edge 26. Also, the semi-circular portion 20 and 21 of the C-clamp are connected together by means of screw fasteners such as screws 27 for example.

Referring to FIG. 4, another embodiment of the present invention is illustrated which shows that the handgrip 11 is without end 12 as shown in FIGS. 1 and 2 and that the protector end 16 includes an element 28 which is circular and adapted to insertably fit over the exterior surface of the terminating end of the handlebar 10 and fit beneath the terminating end of the handgrip 11. Such a construction will readily hold the element 28 in position during usage.

Therefore, in view of the foregoing, it can be seen that the novel hand protector of the present invention provides a novel means for readily assembling the unit onto the opposite ends of a conventional handlebar having handgrips and that the hands of the rider or driver are adequately protected thereby. The shape of the protector is aerodynamic so as to provide wind deflection and to broadly correspond to the general configuration of the user's hand in a clenched condition as the hand grips the handgrip 11. The opposite ends of the protector are releasably connected to the handlebar itself and no connection is made to any portion of the handgrip.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A hand protector for use in combination with a handlebar and a handgrip which comprises:
    an elongated member having opposite ends separated by an integral mid-section;
    said mid-section being of aerodynamic shape having a conical inner surface and substantially arcuate in plan view;
    said ends having retainer means for detachably coupling said member to said handlebar about said handgrip;
    fastener means releasably coupling said retainer means together;
    said retainer means associated with a selected end of said member includes a C-clamping device attached to said handlebar immediately adjacent to the end of said handgrip;
    said retainer means associated with said non-selected end of said member includes an inwardly projecting element entering the bore of said handlebar to retain said non-selected end to said handlebar in cooperation with said handgrip;
    said inwardly projecting element is a tapering nub terminating at its free end in a rounded end;
    said member mid-section incorporates a compound curvature substantially corresponding to the general over-all shape of a driver's knuckles grasping said handgrip; and
    said member and said retainer means are composed of a resilient material.

* * * * *